United States Patent Office 3,131,952
Patented May 5, 1964

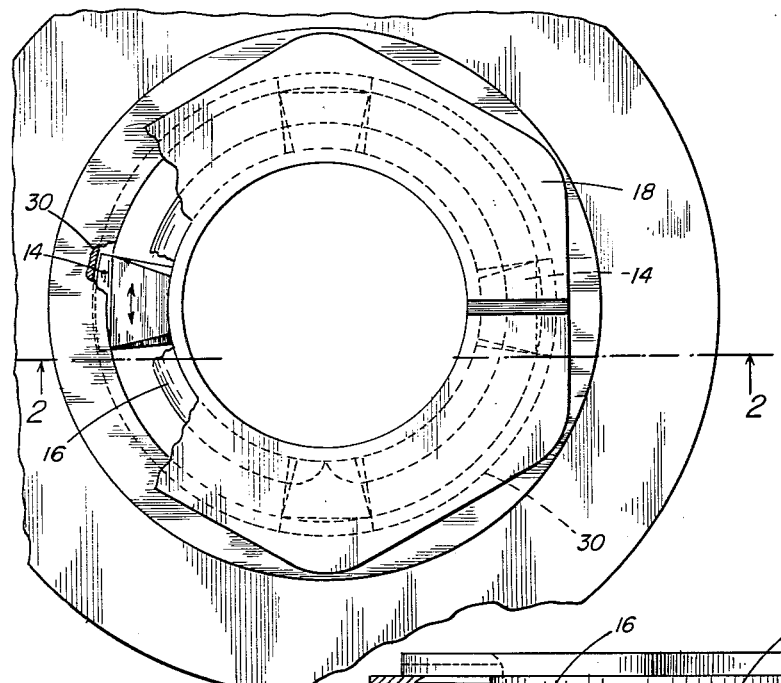
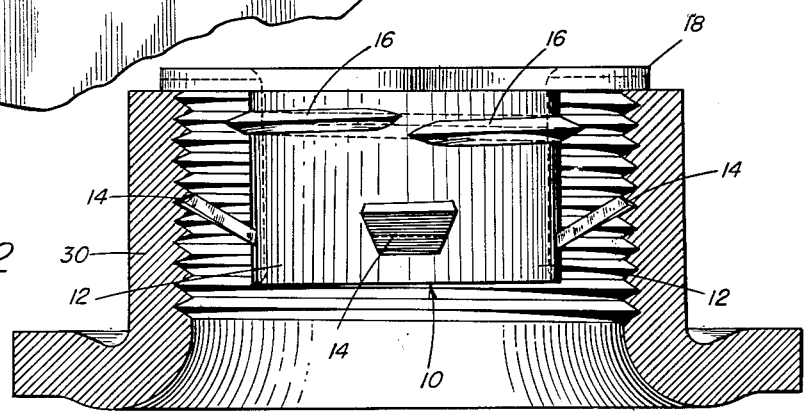
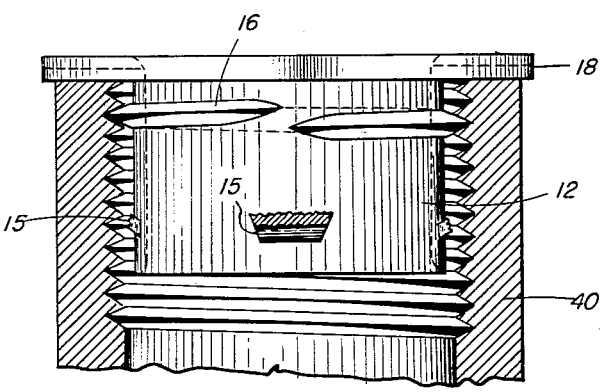

3,131,952
ELECTRICAL FITTING ADAPTABLE TO VARIOUS SIZE CONDUITS
Francis P. D'Esopo, West Hartford, Conn., assignor to The Wiremold Company, West Hartford, Conn., a corporation of Connecticut
Filed Mar. 8, 1962, Ser. No. 178,429
1 Claim. (Cl. 285—3)

This invention relates to electrical fittings. More particularly, the invention relates to floor plate fittings for use in connection with and to be screwed into the ends of pipes, conduits, stubs or the like that extend up through the floor of structures and through which electrical wiring is led or snaked.

Heretofore, when conduits of different size were used, it was necessary for the manufacturer to make and for the installer to have available different sizes of fittings to fit each size of conduit. Two sizes have been quite common, the 1½ inch and the 2¼ inch sizes. For the purpose of example, but not in any limiting sense, reference will be made to them herein.

It is an object of the invention to provide an improvement in fitting constructions which will enable the installer to have available a single fitting which can be used with two or more sizes of conduits, pipe ends or stubs.

Another object is to provide an improved fitting which can be used with large size conduits or by breaking away parts of the fitting, it can be used equally with smaller size conduits, pipe ends and stubs.

Another object is to provide an improved fitting as aforesaid which may be economically manufactured and is of rugged construction and is reliable in use.

Other objects and advantages of the invention will become apparent as the invention is described in connection with the accompanying drawings.

In the drawing:

FIG. 1 is a plan view, partly broken away, of a fitting applied to a large size pipe end or stub.

FIG. 2 is a vertical section view, taken along line 2—2 of FIG. 1, with the fitting being shown in elevation.

FIG. 3 is a view similar to FIG. 2 but with the fitting used in connection with a smaller size pipe than in FIG. 2.

Reference to the drawing, FIGS. 1 and 2 show a floor plate fitting, designated generally by the numeral 10, as connected to a large size nipple, stub or pipe end 30 which is internally threaded and customarily extends up through a floor, base or foundation.

In FIG. 3, the same fitting 10 has been connected to a smaller size nipple or pipe end. Common sizes mentioned merely for the sake of example and not as limiting the invention thereto, are the large 2¼ inch diameter and the smaller 1½ inch diameter.

The fitting 10 has a cylindrical body 12 of external diameter less than the minimum interior diameter of the threaded interior surface of the end of conduit or stub 30. On the top or outer end of the cylindrical body, a flange plate 18 extends radially outward a sufficient distance to overlie the end of the conduit or stub 30, as shown in FIG. 2.

In order to attach and secure the fitting in place within the end of the conduit or stub 30, a plurality of lugs or wings 14 extend from the periphery of the body at spaced positions around the periphery of the cylindrical body portion 12 of the fitting. The wings may be of any suitable width and number. Four wings, each of them one-half inch wide at its outer edge, are illustrated in the embodiment being described; but the invention is not limited to such dimensions or proportions. The wings are or may be slightly tapered or wedge-shaped and affixed to the body 12 of the fitting by welding, brazing, or in any other convenient and suitable fashion, or may be part of the body casting.

The wings also preferably incline upwardly at an acute angle to the outside wall of the body 12 presenting a pointed edge of approximately 60° angularity, to the internal threads of the conduit 30. Moreover, the wings are affixed around the wall 12 of the fitting at progressively greater or lesser distances from the end of the fitting or, in other words, they extend in their spaced positions at different points around a convolution of an imaginary helical spiral on the periphery of the cylindrical body 12, the spiral being similar in pitch to the internal thread on the conduit 30.

The edges of the wings are or may be machined so that they form segments of an interrupted external thread; and they are adapted to engage and mate with the internal thread grooves of the conduit 30 in the same way as if the wings were infinitely multiplied and formed a continuous convolution of an external thread. The wings, thus, enable the fitting to be screwed into the end of the conduit or stub 30 of large diameter.

When it is desired to secure the same fitting into a pipe or stub 40 of smaller diameter, the wings are broken off with pliers by bending and twisting, or they may be knocked off or otherwise removed. The wings are formed and affixed to the cylindrical body 12 so that they come away clean, preferably, but in any case so that any remainder 15 thereof is not sufficient to engage the internal threads of the smaller size pipe 40.

In order that the fitting may be screwed into the smaller conduit 40, a single convolution 16 of a thread is formed on the outer surface of the cylindrical body 12 of size and pitch and shape to engage and mate with the internal threads of the smaller size conduit 40. Although one convolution 16 of an external thread is adequate, the thread 16 may be continued for another convolution or convolutions, if desired, as they will not in any case touch the convolutions of the internal threads on the larger size conduit or stub 30 when the fitting is used there.

The invention is not limited to a fitting with four wings. More or less may be employed as desired in any one or more convolutions, provided there are enough to form an exterior thread surface of one or more convolutions sufficient to take hold of the internal threads of the conduit 30 with sufficient surface of engagement to make a satisfactory and firm fit.

Although one series of wings 14 are shown in the embodiment described of a particular diameter, it is possible to provide another series of wings like 14 to define an interrupted exterior thread surface of lesser diameter than the wings 14, but of greater diameter than the thread 16 and still of less diameter than the minimum internal diameter of the largest conduit or stub with which the wings 14, as shown, are designed to engage. In such case, the wings 14 might be broken away and the intermediate wings (between the size of those shown and the thread 16) will be adapted to engage a conduit or stub of size inbetween that shown in FIG. 3 and that shown in FIG. 2.

Thus, the principles of the invention are adaptable in the creation of fittings which can be used with a number of sizes of conduits, pipe ends, stubs and the like, and the invention is not limited to a fitting which can be used only with one or another of two sizes of conduit.

It will be understood that the term "conduit" as used herein and in the claim is intended to ebrace generically all sizes and kinds of hollow cylindrical members which are internally threaded and through which electric wiring may pass.

Modifications within the scope of the invention will occur to those skilled in the art. Therefore, the invention is not limited to the specific size, form and configuration as illustrated and described.

What is claimed is:

A fitting for connection alternatively to at least two internally threaded electric wiring conduit members of different diameters comprising a cylindrical body of less diameter than the internal diameter of the smallest of the conduit members, at least one convolution of an external thread on said cylindrical body being adapted to mate with the internal thread of a small conduit member, a plurality of wing members forming a portion of an external thread of at least one convolution extending outward from said cylindrical body at spaced points around the periphery of said body and adapted to mate with the internal thread of a conduit larger than the small conduit, the outer edges of said wing member lying in a helical spiral the same as the internal threads within the conduit to which connection is to be made and being adapted to threadedly engage said internal threads, said wings being attached to said body by a frangible connection which when broken leaves the fitting free for threaded connection to a smaller conduit.

References Cited in the file of this patent

UNITED STATES PATENTS

| | | |
|---|---|---|
| 589,813 | Campbell | Sept. 14, 1897 |
| 633,324 | Luke | Sept. 19, 1899 |
| 1,069,451 | Marston | Aug. 5, 1913 |
| 1,796,077 | Boosey | Mar. 10, 1931 |
| 2,607,259 | Forster | Aug. 19, 1952 |
| 2,745,457 | Lang | May 15, 1956 |